United States Patent
Li et al.

(10) Patent No.: US 10,477,584 B2
(45) Date of Patent: Nov. 12, 2019

(54) METHOD AND DEVICE FOR CHANNEL DETECTION CONFIGURATION OF LISTEN-BEFORE-TALK MECHANISM ON UNLICENSED SPECTRUM

(71) Applicant: Yulong Computer Telecommunication Scientific (Shenzhen) Co., Ltd., Shenzhen, Guangdong (CN)

(72) Inventors: Mingju Li, Guangdong (CN); Yajun Zhu, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/021,849

(22) Filed: Jun. 28, 2018

(65) Prior Publication Data

US 2018/0310339 A1 Oct. 25, 2018

Related U.S. Application Data

(63) Continuation of application No. PCT/CN2016/072867, filed on Jan. 29, 2016.

(30) Foreign Application Priority Data

Dec. 31, 2015 (CN) .......................... 2015 1 1032010

(51) Int. Cl.
H04W 72/12 (2009.01)
H04W 74/08 (2009.01)
(Continued)

(52) U.S. Cl.
CPC ....... *H04W 74/0816* (2013.01); *H04L 1/1874* (2013.01); *H04W 16/14* (2013.01);
(Continued)

(58) Field of Classification Search
CPC ..................................................... H04W 72/12
See application file for complete search history.

(56) References Cited

U.S. PATENT DOCUMENTS

| 2015/0071220 A1 | 3/2015 | Luo et al. |
| 2015/0103782 A1 | 4/2015 | Xu et al. |
| 2018/0279367 A1* | 9/2018 | Han ................. H04W 74/0808 |

FOREIGN PATENT DOCUMENTS

| CN | 104717686 A | 6/2015 |
| CN | 104768197 A | 7/2015 |

(Continued)

*Primary Examiner* — Sulaiman Nooristany
(74) *Attorney, Agent, or Firm* — Young Basile Hanlon & MacFarlane, P.C.

(57) ABSTRACT

A method and a device for a channel detection configuration of a listen-before-talk mechanism on an unlicensed spectrum are provided. The method includes comparing a current cell load value with a preset load threshold value when there is data to be sent in a data buffer; determining a channel occupation time required and a duration proportion, and determining a priority of the current cell, when the current cell load value is smaller than or equal to the preset load threshold value; comparing the priority of the current cell with a preset threshold priority; performing a channel detection with clear channel assessment (CCA) according to a channel detection parameter of a first type of listen-before-talk mechanism when the priority of the current cell is greater than the preset threshold priority, and starting to transmit the data when the channel detection with CCA is completed.

20 Claims, 3 Drawing Sheets

(51) Int. Cl.
*H04L 1/18* (2006.01)
*H04W 16/14* (2009.01)
*H04L 5/00* (2006.01)

(52) U.S. Cl.
CPC ....... *H04W 72/1242* (2013.01); *H04L 1/1812* (2013.01); *H04L 5/0055* (2013.01)

(56) References Cited

FOREIGN PATENT DOCUMENTS

| | | |
|---|---|---|
| CN | 105072690 A | 11/2015 |
| WO | WO2015057654 A | 4/2015 |
| WO | WO2015061124 A | 4/2015 |

* cited by examiner

METHOD AND DEVICE FOR CHANNEL DETECTION CONFIGURATION OF LISTEN-BEFORE-TALK MECHANISM ON UNLICENSED SPECTRUM

CROSS-REFERENCE TO RELATED APPLICATION(S)

This application is a continuation of International Application No. PCT/CN2016/072867, filed on Jan. 29, 2016, which claims priority to Chinese application No. 201511032010.4, filed on Dec. 31, 2015, the contents of both of which are hereby incorporated by reference in their entireties.

TECHNICAL FIELD

This disclosure relates to the field of communication technology, and more particularly, to a method and a device for a channel detection configuration of a listen-before-talk mechanism on an unlicensed spectrum.

BACKGROUND

With the popularity of long term evolution (LTE) technology, the wireless data flow is increased in a blowout mode, and the requirement of a cellular data system on spectrum resources is continuously intensified. An auxiliary assisted access (LAA) small cell is proposed in the 3GPP release 13 standard, and the small cell can not only be deployed in an existing licensed spectrum, but only can be deployed in an unlicensed spectrum at the same time, such that the spectrum resources can be fully utilized. However, a coexistence of a LAA system and a wireless fidelity (Wi-Fi) system in an unlicensed 5 GHz spectrum has become the largest challenge.

In order to avoid the collisions, listen-before-talk (LBT) technology is applied to the LAA system in the related art. The LBT channel detection mechanism includes a load-based equipment (LBE) mechanism and a frame-based equipment (LBE) mechanism. Under the LBE mechanism, when there exists data to be sent in a data buffer, a channel is firstly subjected to energy detection, which is called as a channel detection with clear channel assessment detection (CCA). When a channel detection indicates that the channel is idle, and the data then starts to be transmitted. The channel will always be occupied until a maximum channel occupation time or the data buffer is empty. In fact, users can simultaneously generate data packets of various services in daily life. Different data packets are different in size, and different types of services have different requirements for channel resources, and the time delay requirement of a real-time service is higher (such as video communication), the time delay requirement of the non-real-time service is lower (such as short message service). Users served by each wireless hotspot vary in the time of requesting data packets, and are prone to emergencies. An existing LAA channel backoff mechanism implements a single standard for all services and is prone to the situation where wireless hotspots do not compete for channels for a long time. The unreasonable allocation of channel resources leads to the inability to flexibly meet users' requirements of quality of service and to balance the system load.

SUMMARY

Implementations of the present disclosure provide a method and a device for a channel detection configuration of a listen-before-talk mechanism on an unlicensed spectrum, so as to solve a problem of unreasonable allocation of channel resources when LAA and Wi-Fi coexist.

According to a first aspect of the disclosure, a method for a channel detection configuration of a listen-before-talk mechanism on an unlicensed spectrum is provided. The method includes the following.

A current cell load value is compared with a preset load threshold value when there is data to be sent in a data buffer.

A channel occupation time required for transmitting the data to be sent and a duration proportion of which the current cell occupies a channel in a preset duration prior to transmitting the data to be sent are determined, and a priority of the current cell is determined according to the channel occupation time and the duration proportion, when the current cell load value is smaller than or equal to the preset load threshold value.

The priority of the current cell is compared with a preset threshold priority.

A channel detection with clear channel assessment (CCA) is performed according to a channel detection parameter of a first type of listen-before-talk mechanism when the priority of the current cell is greater than the preset threshold priority, and starting to transmit the data when the channel detection with CCA is completed.

According to a second aspect of the disclosure, a device for a channel detection configuration of a listen-before-talk mechanism on an unlicensed spectrum is provided. The device includes a processor and a memory.

The memory is coupled with the processor and configured to store program codes which, when executed by the processor, become operational with the processor configured to compare a current cell load value with a preset load threshold value when there is data to be sent in a data buffer; determine a channel occupation time required for transmitting the data to be sent and a duration proportion of which the current cell occupies a channel in a preset duration prior to transmitting the data to be sent, and to determine a priority of the current cell according to the channel occupation time and the duration proportion, when the current cell load value is smaller than or equal to the preset load threshold value; compare the priority of the current cell with a preset threshold priority; and perform a channel detection with clear channel assessment (CCA) according to a channel detection parameter of a first type of listen-before-talk mechanism when the priority of the current cell is greater than the preset threshold priority, and starting to transmit the data when the channel detection with CCA is completed.

According to a third aspect of the disclosure, a non-transitory computer storage medium is provided. The non-transitory computer storage medium is configured to store programs which, when executed by a computer, are operable with the computer to compare a current cell load value with a preset load threshold value when there is data to be sent in a data buffer; determine a channel occupation time required for transmitting the data to be sent and a duration proportion of which the current cell occupies a channel in a preset duration prior to transmitting the data to be sent, and determining a priority of the current cell according to the channel occupation time and the duration proportion, when the current cell load value is smaller than or equal to the preset load threshold value; compare the priority of the current cell with a preset threshold priority; and perform a channel detection with clear channel assessment (CCA) according to a channel detection parameter of a first type of listen-before-talk mechanism when the priority of the current cell is greater than the preset threshold priority, and starting to transmit the data when the channel detection with CCA is completed.

The beneficial effects of implementations of the present disclosure are as follows.

By setting the preset load threshold, a channel detection parameter of the second type or the first type of listen-before-talk mechanism can be flexibly selected according to the LAA cell load condition for CCA detection to send data and other further processing. When the LAA cell load is lower, the channel detection parameter of the first type of listen-before-talk mechanism can be employed to shorten a channel detection duration and improve the processing efficiency and resource utilization rate. An introduction of the priority increases the fairness of the channel resource competition, and since the priority is calculated according to channel occupation time required and the duration proportion of which the current cell occupies a channel in a preset duration prior to transmitting the data to be sent, it is possible to prevent an unreasonable phenomenon that a cell, generating smaller packets at a high frequency, frequently occupies the channel resources for a short period of time, which can better balance the overall system load pressure and resource allocation ratio. When the LAA cell load is higher or the priority of the current cell is lower than that of the preset threshold priority, it may turn to a processing of the channel detection employing the channel detection parameter of a second type of listen-before-talk mechanism. And a size of a contention window can be adaptively adjusted according to load conditions and channel conditions of other cells in the Wi-Fi system and the LAA system, thereby enhancing the fairness and effectiveness of channel competition, improving the overall performance of the LAA system on the premise of good coexistence with the Wi-Fi system, and further optimizing the distribution of the channel resources in the coexistence of the Wi-Fi system and the LAA system.

BRIEF DESCRIPTION OF THE DRAWINGS

To illustrate the technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

Figure 1:
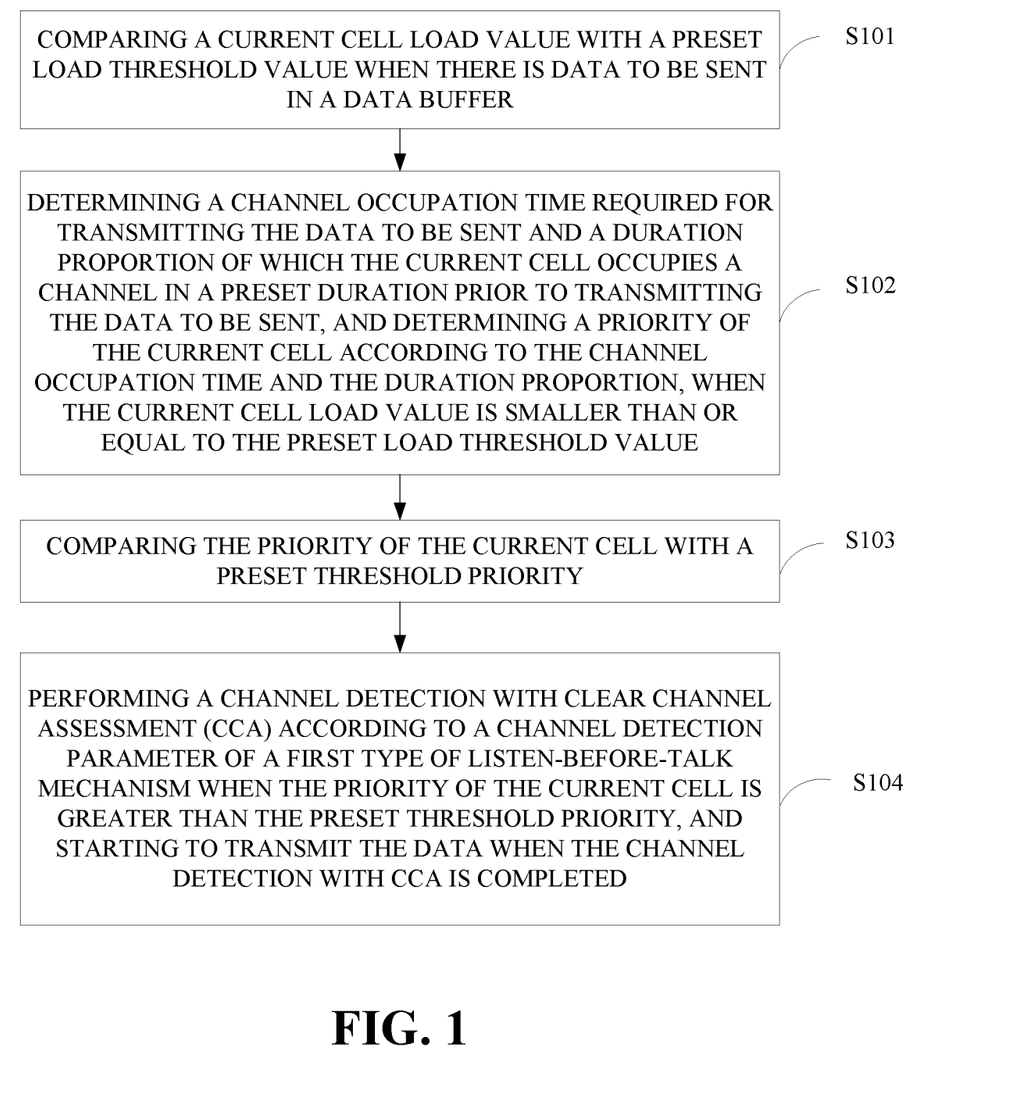
FIG. 1 is a schematic flow diagram of a method for a channel detection configuration of a listen-before-talk mechanism on an unlicensed spectrum according to a first implementation of the present disclosure.

FIG. 1 is a schematic flow diagram of a method for processing collision according to a first implementation of the present disclosure. The method includes the following.

At block S101, a current cell load value may be compared with a preset load threshold value when there is data to be sent in a data buffer.

As an implementation, a load threshold value L and a threshold priority h can be preset when a system is initializing. The load threshold value and the threshold priority can be adaptively adjusted according to real-time load conditions of the system.

It is determined whether there is data to be sent in a current timeslot LAA cell. When the data buffer is in a non-empty state (i.e., there is data to be sent), the load threshold value is compared with the threshold priority. It is then determined whether to further calculate a priority of the current cell or to conduct a process of channel idle detection employing a channel detection parameter of a second type of listen-before-talk mechanism according to a comparison result.

At block S102, a channel occupation time required for transmitting the data to be sent and a duration proportion of which the current cell occupies a channel in a preset duration prior to transmitting the data to be sent are determined, and a priority of the current cell is determined according to the channel occupation time and the duration proportion, when the current cell load value is smaller than or equal to the preset load threshold value.

As an implementation, the channel occupation time required may be determined according to a total size of data packets in the data buffer and current channel quality.

As an implementation, the priority of the current cell is calculated according to the following formula:

$$H = \beta * \left(1 - \frac{T_0}{T}\right) + (1-\beta) * \frac{1}{t}$$

where H represents the priority of the current cell, T0 represents a duration of which the current cell occupies the channel in a preset duration T prior to transmitting the data to be sent, t represents the channel occupation time required, β represents an adjustment factor determined according to an occupation condition of the current cell channel resources and a service quality requirement of the data to be sent, and $0 \leq \beta \leq 1$.

At block S103, the priority of the current cell is compared with a preset threshold priority At block S104, a channel detection with clear channel assessment (CCA) is performed according to a channel detection parameter of a first type of listen-before-talk mechanism when the priority of the current cell is greater than the preset threshold priority, and the data starts to be transmitted when the channel detection with CCA is completed.

The CCA detection can be carried out continuously, and the data can be transmitted as long as the CCA detection is completed once. A channel detection with clear channel assessment (CCA) is performed according to a channel detection parameter of a first type of listen-before-talk mechanism as follows.

The channel detection is performed continuously, the data starts to be transmitted when a continuous channel idle time reaches a time length of time granularity of an initial channel detection, where the time length of time granularity of an initial channel detection is 16 us+n*9 us, and n may be 1 or 2.

By setting the preset load threshold, a channel detection parameter of the second type or the first type of listen-before-talk mechanism can be flexibly selected according to the LAA cell load condition for CCA detection to send data and other further processing. When the LAA cell load is lower, the channel detection parameter of the first type of listen-before-talk mechanism can be employed to shorten a channel detection duration and improve the processing efficiency and resource utilization rate. An introduction of the priority increases the fairness of the channel resource competition, and since the priority is calculated according to channel occupation time required and the duration proportion of which the current cell occupies a channel in a preset duration prior to transmitting the data to be sent, it is possible to prevent an unreasonable phenomenon that a cell, generating smaller packets at a high frequency, frequently occupies the channel resources for a short period of time, which can better balance the overall system load pressure and resource allocation ratio.

Figure 2:
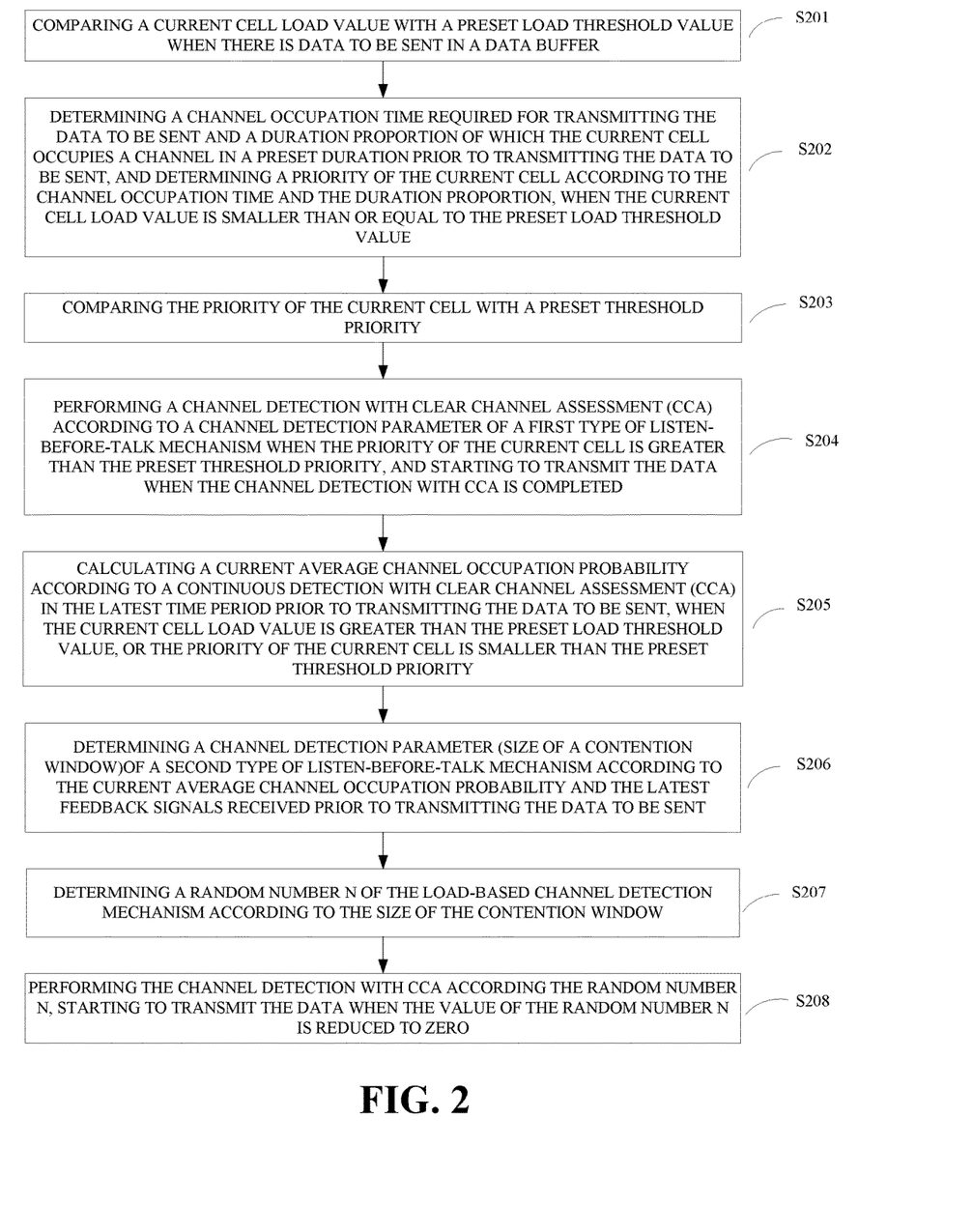
FIG. 2 is a schematic flow diagram of a method for a channel detection configuration of a listen-before-talk mechanism on an unlicensed spectrum according to a second implementation of the present disclosure.

FIG. 2 is a schematic flow diagram of a method for processing collision according to a second implementation of the present disclosure. Implementations of the method include the following.

At block S201, a current cell load value is compared with a preset load threshold value when there is data to be sent in a data buffer.

As an implementation of the present disclosure, a load threshold value L and a threshold priority h can be preset when a system is initializing. The load threshold value and the threshold priority can be adaptively adjusted according to real-time load conditions of the system.

It is determined whether there is data to be sent in a current timeslot LAA cell. When the data buffer is in a non-empty state (i.e., there is data to be sent), the load threshold value is compared with the threshold priority. It is then determined whether to further calculate a priority of the current cell or to conduct a process of channel idle detection employing a channel detection parameter of a second type of listen-before-talk mechanism according to a comparison result.

At block S202, a channel occupation time required for transmitting the data to be sent and a duration proportion of which the current cell occupies a channel in a preset duration prior to transmitting the data to be sent are determined, and a priority of the current cell is determined according to the channel occupation time and the duration proportion, when the current cell load value is smaller than or equal to the preset load threshold value.

When the current cell load value is greater than the preset load threshold value, the method may advance to block S205.

As an implementation, the channel occupation time required may be determined according to a total size of data packets in the data buffer and current channel quality.

As an implementation, the priority of the current cell is calculated according to the following formula:

$$H = \beta * \left(1 - \frac{T_0}{T}\right) + (1 - \beta) * \frac{1}{t}$$

where H represents the priority of the current cell, T0 represents a duration of which the current cell occupies the channel in a preset duration T prior to transmitting the data to be sent, t represents the channel occupation time required, β represents an adjustment factor determined according to an occupation condition of the current cell channel resources and a service quality requirement of the data to be sent, and $0 \leq \beta \leq 1$.

At block S203, the priority of the current cell is compared with a preset threshold priority At block S204, a channel detection with clear channel assessment (CCA) is performed according to a channel detection parameter of a first type of listen-before-talk mechanism when the priority of the current cell is greater than the preset threshold priority, and the data starts to be transmitted when the channel detection with CCA is completed.

The CCA detection can be carried out continuously, and the data can be transmitted as long as the CCA detection is completed once. A channel detection with clear channel assessment (CCA) is performed according to a channel detection parameter of a first type of listen-before-talk mechanism as follows.

The channel detection is performed continuously, the data starts to be transmitted when a continuous channel idle time reaches a time length of time granularity of an initial channel detection, where the time length of time granularity of an initial channel detection is 16 us+n*9 us, and n may be 1 or 2.

When the priority of the current cell is smaller than the preset threshold priority, the method may advance to block S205. When the priority of the current cell is equal to the preset threshold priority, the method may advance to block S205 or return to block S204.

At block S205, a current average channel occupation probability is calculated according to a continuous detection with clear channel assessment (CCA) in the latest time period prior to transmitting the data to be sent.

A channel detection parameter of a second type of listen-before-talk mechanism is determined according to the current average channel occupation probability and the latest feedback signals received (that is, feedback signals received in the latest period of time) prior to transmitting the data to be sent.

The feedback signals include an acknowledgment (ACK) signal and a non-acknowledgment (NACK) signal of hybrid automatic repeat request (HARQ).

The channel detection parameter of the second type of listen-before-talk mechanism includes a size of a contention window of a load-based channel detection mechanism, and the channel detection parameter of the first type of listen-before-talk mechanism includes a size of a contention window of a Frame-based channel detection mechanism.

At block S206, a random number N of the load-based channel detection mechanism is determined according to the size of the contention window; and At block S207, the channel detection with CCA is performed according to the random number N, starting to transmit the data when the value of the random number N is reduced to zero.

As an implementation of the present disclosure, the current average channel occupation probability is calculated according to the following formula:

$$P = \frac{N_F}{N_S + N_F}$$

where P represents the current average channel occupation probability, Ns represents a number of times of idle channel detection in the continuous detection with clear channel assessment (CCA) in the latest time period prior to transmitting the data to be sent, and NF represents a number of times of busy channel detection in the continuous detection with clear channel assessment (CCA) in the latest time period prior to transmitting the data to be sent.

The size of the contention window is calculated according to the following formula:

$$Q = \begin{cases} q; \text{when } P\ 0.5 \text{ and the } ACK \text{ signal is received, or} \\ \quad\quad \text{when } P \leq 0.5 \text{ and the } NACK \text{ signal is received} \\ \frac{q-1}{2}; \text{when } P \leq 0.5 \text{ and the } ACK \text{ signal is received} \\ 2q+1; \text{when } P \phi\ 0.5 \text{ and the } NACK \text{ signal is received} \end{cases}$$

where Q represents the size of the contention window in the current timeslot, q represents a size of the previous contention window, and 0≤N≤Q.

When performing CCA detection, a countdown is started. Once the CCA detection is successful, N is decremented by one. When the N is reduced to 0, starting to transmit the data.

In above-mentioned implementation of the present disclosure, when the LAA cell load is higher or the priority of the current cell is lower than that of the preset threshold priority, it may turn to a processing of the channel detection employing the channel detection parameter of a second type of listen-before-talk mechanism. And a size of a contention window can be adaptively adjusted according to load conditions and channel conditions of other cells in the Wi-Fi system and the LAA system, thereby enhancing the fairness and effectiveness of channel competition, improving the overall performance of the LAA system on the premise of good coexistence with the Wi-Fi system, and further optimizing the distribution of the channel resources in the coexistence of the Wi-Fi system and the LAA system.

Figure 3:
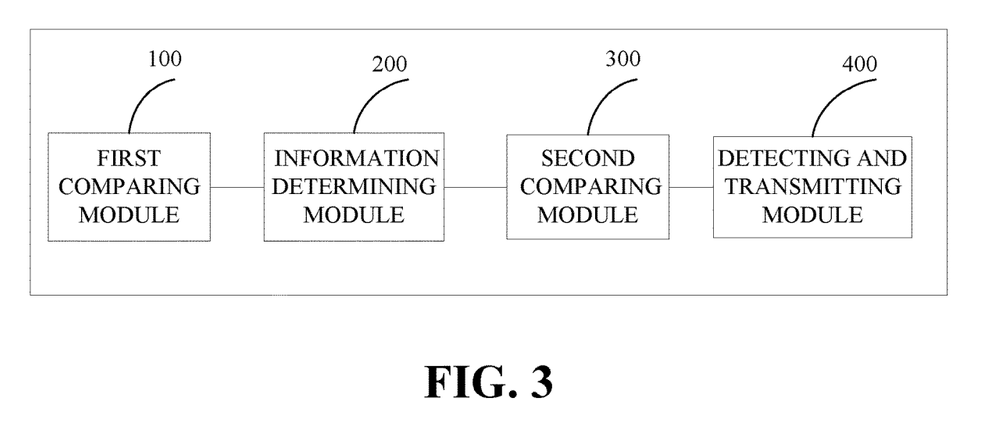
FIG. 3 is a schematic structural diagram of a device for a channel detection configuration of a listen-before-talk mechanism on an unlicensed spectrum according to an implementation of the present disclosure.
Figure 4:
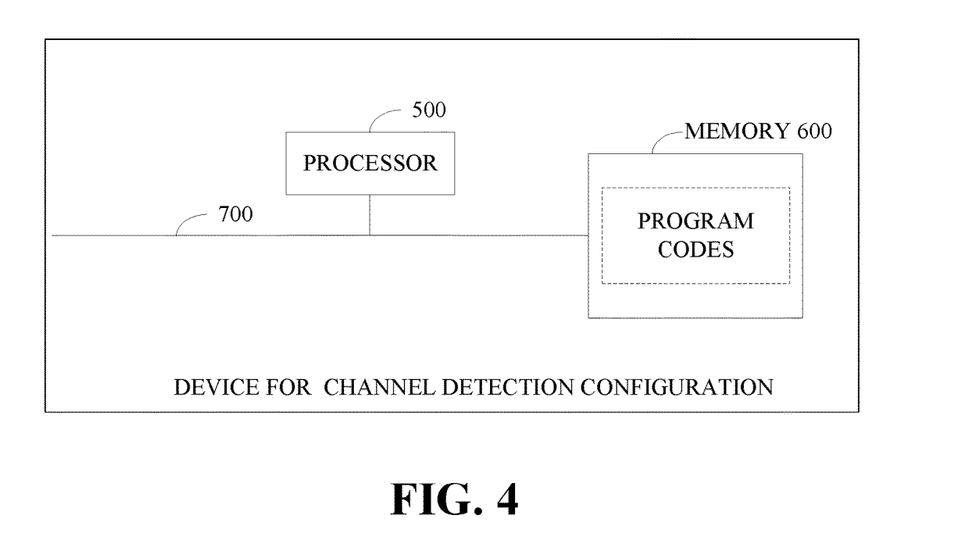
FIG. 4 is a schematic structural diagram illustrating another device for a channel detection configuration of a listen-before-talk mechanism on an unlicensed spectrum according to an implementation of the present disclosure.

FIG. 3 is a schematic structural diagram of a device for a channel detection configuration of a listen-before-talk mechanism on an unlicensed spectrum according to an implementation of the present disclosure. The device includes a first comparing module 100, an information determining module 200, a second comparing module 300, and a detecting and transmitting module 400. Referring to FIG. 4, these components can be integrated into a processor 500 for example. The processor 500 may be coupled with a memory 600 via a bus 700. The memory 600 is configured to store at least one program which, when executed by the processor 500, become operable with the processor 500 to carry out the methods of the implementations of the present disclosure.

The first comparing module 100 is configured to compare a current cell load value with a preset load threshold value when there is data to be sent in a data buffer.

As an implementation, a load threshold value L and a threshold priority h can be preset when a system is initializing. The load threshold value and the threshold priority can be adaptively adjusted according to real-time load conditions of the system.

It is determined whether there is data to be sent in a current timeslot LAA cell. When the data buffer is in a non-empty state (i.e., there is data to be sent), the load threshold value is compared with the threshold priority. It is then determined whether to further calculate a priority of the current cell or to conduct a channel idle detection employing a channel detection parameter of a second type of listen-before-talk mechanism according to a comparison result.

The information determining module 200 is configured to determine a channel occupation time required for transmitting the data to be sent and a duration proportion of which the current cell occupies a channel in a preset duration prior to transmitting the data to be sent, and to determine a priority of the current cell according to the channel occupation time and the duration proportion, when the current cell load value is smaller than or equal to the preset load threshold value.

The second comparing module 300 is configured to compare the priority of the current cell with a preset threshold priority.

The detecting and transmitting module 400 is configured to perform a channel detection with clear channel assessment (CCA) according to a channel detection parameter of a first type of listen-before-talk mechanism when the priority of the current cell is greater than the preset threshold priority, and starting to transmit the data when the channel detection with CCA is completed.

As an implementation, the channel occupation time required may be determined according to a total size of data packets in the data buffer and current channel quality.

The CCA detection can be carried out continuously, and the data can be transmitted as long as the CCA detection is completed once. A channel detection with clear channel assessment (CCA) is performed according to a channel detection parameter of a first type of listen-before-talk mechanism as follows.

The channel detection is performed continuously, the data starts to be transmitted when a continuous channel idle time reaches a time length of time granularity of an initial channel detection, where the time length of time granularity of an initial channel detection is 16 us+n*9 us, and n may be 1 or 2.

The information determining module is configured to calculate the priority of the current cell according to the following formula:

$$H = \beta * \left(1 - \frac{T_0}{T}\right) + (1-\beta) * \frac{1}{t}$$

where H represents the priority of the current cell, T0 represents a duration of which the current cell occupies the channel in a preset duration T prior to transmitting the data to be sent, t represents the channel occupation time required, β represents an adjustment factor determined according to an occupation condition of the current cell channel resources and a service quality requirement of the data to be sent, and 0≤β≤1.

As an implementation, the information determining module 200 is further configured to perform the following.

Calculate a current average channel occupation probability according to a continuous detection with clear channel assessment (CCA) in the latest time period prior to transmitting the data to be sent, when the current cell load value is greater than the preset load threshold value or the priority of the current cell is smaller than the preset threshold priority.

Determine a channel detection parameter of a second type of listen-before-talk mechanism according to the current average channel occupation probability and the latest feedback signals received prior to transmitting the data to be sent, wherein the feedback signals include an acknowledgment (ACK) signal and a non-acknowledgement (NACK) signal of hybrid automatic repeat request (HARD), and the channel detection parameter of the second type of listen-before-talk mechanism includes a size of a contention window of a load-based channel detection mechanism.

Determine a random number N of the load-based channel detection mechanism according to the size of the contention window.

Perform the channel detection with CCA according to the random number N, and to start to transmit the data when the value of the random number N is reduced to zero.

As an implementation, the information determining module 200 is configured to calculate the current average channel occupation probability according to the following formula:

$$P = \frac{N_F}{N_S + N_F}$$

where P represents the current average channel occupation probability, Ns represents a number of times of idle channel detection in the continuous detection with clear channel assessment (CCA) in the latest time period prior to transmitting the data to be sent, and NF represents a number of times of busy channel detection in the continuous detection with clear channel assessment (CCA) in the latest time period prior to transmitting the data to be sent.

The size of the contention window is calculated according to the following formula:

$$Q = \begin{cases} q; \text{ when } P \phi \ 0.5 \text{ and the } ACK \text{ signal is received, or} \\ \quad \text{ when } P \leq 0.5 \text{ and the } NACK \text{ signal is received} \\ \frac{q-1}{2}; \text{ when } P \leq 0.5 \text{ and the } ACK \text{ signal is received} \\ 2q+1; \text{ when } P \phi \ 0.5 \text{ and the } NACK \text{ signal is received} \end{cases}$$

where Q represents the size of the contention window in the current timeslot, q represents a size of the previous contention window, and $0 \leq N \leq Q$.

The above-mentioned first comparing module 100, the information determining module 200, the second comparing module 300, and the detecting and transmitting module 400 may exist independently or may be integrally set. The first comparing module 100, the information determining module 200, the second comparing module 300, and the detecting and transmitting module 400 may be separately provided in a hardware form, and independent of a processor of the device for processing collision, and may be provided in a form of a microprocessor. They may also be embedded in the processor of the device in the form of hardware, and may also be stored in the memory of the device in a software form, so as to facilitate the processor of the device to call and execute the operations corresponding to the above-mentioned first comparing module 100, the information determining module 200, the second comparing module 300, and the detecting and transmitting module 400.

For example, in the implementation of the device for processing collision of the present disclosure (i.e., the implementation shown in FIG. 3), the information determining module 200 may be the processor of the device, and the first comparing module 100, the second comparing module 300, and the detecting and transmitting module 400 may be components embedded in the processor or disposed independently of the processor, and may also be stored in the memory in a form of software, and the functions thereof can be called by the processor. The implementations of the present disclosure do not impose any limitation. The above processor may be a central processing unit (CPU), a microprocessor, a microcontroller, and the like.

The first comparing module 100 and the second comparing module 300 can be integrated or can be independently disposed, the detecting and transmitting module 400 can be divided into a detecting sub-module and a transmitting sub-module; the detecting sub-module and the transmitting sub-module can be integrated or can be independently disposed.

It should be noted that various implementations in the specification are described in a progressive manner, the emphasis of each implementation will be placed on the differences from other implementations, and the same or similar parts among the implementations can be referred to each other. For the device implementations, since it is basically similar to the method implementations, the description of the device implementations is relatively simple, and for related parts, reference may be made to a part of the description of the method implementations.

With the description of the above implementations, the present disclosure has the following advantages.

By setting the preset load threshold, a channel detection parameter of the second type or the first type of listen-before-talk mechanism can be flexibly selected according to the LAA cell load condition for CCA detection to send data and other further processing. When the LAA cell load is lower, the channel detection parameter of the first type of listen-before-talk mechanism can be employed to shorten a channel detection duration and improve the processing efficiency and resource utilization rate. An introduction of the priority increases the fairness of the channel resource competition, and since the priority is calculated according to channel occupation time required and the duration proportion of which the current cell occupies a channel in a preset duration prior to transmitting the data to be sent, it is possible to prevent an unreasonable phenomenon that a cell, generating smaller packets at a high frequency, frequently occupies the channel resources for a short period of time, which can better balance the overall system load pressure and resource allocation ratio.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), and so on.

The above-disclosed implementations are only preferred implementations of the present application, and certainly are not intended for limiting the scope of the present application. Therefore, equivalent changes made according to the claims of the present application shall still fall within the protection scope of the present application.

What is claimed is:

1. A method for a channel detection configuration of a listen-before-talk mechanism on an unlicensed spectrum, comprising:

comparing, by a processor, a current cell load value with a preset cell load threshold value when there is data to be sent in a data buffer;

calculating, by the processor, a priority of a current cell based on a channel occupation time required for transmitting the data to be sent, a duration proportion of which the current cell occupies a channel in a preset duration prior to transmitting the data to be sent, and an adjustment factor determined according to an occupation condition of current cell channel resources and a service quality requirement of the data to be sent, when the current cell load value is less than or equal to the preset cell load threshold value;

comparing, by the processor, the priority of the current cell with a preset priority threshold; and performing, by the processor, a channel detection with clear channel assessment (CCA) according to a channel detection parameter of a listen-before-talk mechanism when the priority of the current cell is greater than the preset priority threshold, and starting to transmit the data when the channel detection with CCA is completed.

2. The method of claim 1, wherein performing the channel detection with the clear channel assessment (CCA) according to the channel detection parameter of the listen-before-talk mechanism comprises:

performing, by the processor, the channel detection continuously, starting to transmit the data when a continuous channel idle time reaches a time length of time granularity of an initial channel detection.

3. The method of claim 2, further comprising:

calculating, by the processor, a current average channel occupation probability according to a continuous detection with clear channel assessment (CCA) in the latest time period prior to transmitting the data to be sent, when the current cell load value is greater than the preset cell load threshold value or the priority of the current cell is less than the preset priority threshold;

determining, by the processor, the channel detection parameter of the listen-before-talk mechanism according to the current average channel occupation probability and the latest feedback signals received prior to transmitting the data to be sent, wherein the latest feedback signals comprise an acknowledgment (ACK) signal and a non-acknowledgement (NACK) signal of hybrid automatic repeat request (HARQ), and the channel detection parameter of the listen-before-talk mechanism comprises a size of a contention window of a load-based channel detection mechanism;

determining, by the processor, a random number N of the load-based channel detection mechanism according to the size of the contention window; and performing, by the processor, the channel detection with CCA according to the random number N, starting to transmit the data when a value of the random number N is reduced to zero.

4. The method of claim 1, further comprising:

determining, by the processor, the channel occupation time required according to a total size of data packets in the data buffer and current channel quality.

5. The method of claim 1, wherein the priority of the current cell is calculated according to the following formula:

$$H = \beta * \left(1 - \frac{T_0}{T}\right) + (1 - \beta) * \frac{1}{t}$$

wherein H represents the priority of the current cell, T represents the preset duration, $T_0$ represents a duration of which the current cell occupies the channel in the preset duration T prior to transmitting the data to be sent, t represents the channel occupation time required, $\beta$ represents the adjustment factor determined according to the occupation condition of current cell channel resources and the service quality requirement of the data to be sent, and $0 \leq \beta \leq 1$.

6. The method of claim 1, further comprising:

calculating, by the processor, a current average channel occupation probability according to a continuous detection with clear channel assessment (CCA) in the latest time period prior to transmitting the data to be sent, when the current cell load value is greater than the preset cell load threshold value or the priority of the current cell is less than the preset priority threshold;

determining, by the processor, the channel detection parameter of the listen-before-talk mechanism according to the current average channel occupation probability and the latest feedback signals received prior to transmitting the data to be sent, wherein the latest feedback signals comprise an acknowledgment (ACK) signal and a non-acknowledgement (NACK) signal of hybrid automatic repeat request (HARQ), and the channel detection parameter of the listen-before-talk mechanism comprises a size of a contention window of a load-based channel detection mechanism;

determining, by the processor, a random number N of the load-based channel detection mechanism according to the size of the contention window; and performing, by the processor, the channel detection with CCA according to the random number N, starting to transmit the data when a value of the random number N is reduced to zero.

7. The method of claim 6, wherein the current average channel occupation probability is calculated according to the following formula:

$$P = \frac{N_F}{N_S + N_F}$$

wherein P represents the current average channel occupation probability, $N_s$ represents a number of times of idle channel detection in the continuous detection with clear channel assessment (CCA) in the latest time period prior to transmitting the data to be sent, and $N_F$ represents a number of times of busy channel detection in the continuous detection with clear channel assessment (CCA) in the latest time period prior to transmitting the data to be sent; and wherein the size of the contention window is calculated according to the following formula:

$$Q = \begin{cases} q; \text{ when } P > 0.5 \text{ and the } ACK \text{ signal is received, or} \\ \quad \text{when } P \leq 0.5 \text{ and the } NACK \text{ signal is received} \\ \frac{q-1}{2}; \text{ when } P \leq 0.5 \text{ and the } ACK \text{ signal is received} \\ 2q+1; \text{ when } P > 0.5 \text{ and the } NACK \text{ signal is received} \end{cases}$$

wherein Q represents the size of the contention window in a current timeslot, q represents a size of a previous contention window, and 0≤N≤Q.

8. A device for a channel detection configuration of a listen-before-talk mechanism on an unlicensed spectrum, comprising:
a processor; and
a memory, coupled with the processor and configured to store program codes which, when executed by the processor, become operational with the processor to:
compare a current cell load value with a preset cell load threshold value when there is data to be sent in a data buffer;
calculate a priority of a current cell based on a channel occupation time required for transmitting the data to be sent, a duration proportion of which the current cell occupies a channel in a preset duration prior to transmitting the data to be sent, and an adjustment factor determined according to an occupation condition of current cell channel resources and a service quality requirement of the data to be sent, when the current cell load value is less than or equal to the preset cell load threshold value;
compare the priority of the current cell with a preset priority threshold; and
perform a channel detection with clear channel assessment (CCA) according to a channel detection parameter of a listen-before-talk mechanism when the priority of the current cell is greater than the preset priority threshold, and start to transmit the data when the channel detection with CCA is completed.

9. The device of claim 8, wherein the processor configured to perform the channel detection with the clear channel assessment (CCA) according to the channel detection parameter of the listen-before-talk mechanism is further configured to perform the channel detection continuously, and start to transmit the data when a continuous channel idle time reaches a time length of time granularity of an initial channel detection.

10. The device of claim 9, wherein the processor is further configured to:
calculate a current average channel occupation probability according to a continuous detection with clear channel assessment (CCA) in the latest time period prior to transmitting the data to be sent, when the current cell load value is greater than the preset cell load threshold value or the priority of the current cell is less than the preset priority threshold;
determine the channel detection parameter of the listen-before-talk mechanism according to the current average channel occupation probability and the latest feedback signals received prior to transmitting the data to be sent, wherein the latest feedback signals comprise an acknowledgment (ACK) signal and a non-acknowledgement (NACK) signal of hybrid automatic repeat request (HARQ), and the channel detection parameter of the listen-before-talk mechanism comprises a size of a contention window of a load-based channel detection mechanism;
determine a random number N of the load-based channel detection mechanism according to the size of the contention window; and
perform the channel detection with CCA according to the random number N, and transmit the data when a value of the random number N is reduced to zero.

11. The device of claim 8, wherein the channel occupation time required is determined according to a total size of data packets in the data buffer and current channel quality.

12. The device of claim 8, wherein the processor is further configured to calculate the priority of the current cell according to the following formula:

$$H = \beta * \left(1 - \frac{T_0}{T}\right) + (1 - \beta) * \frac{1}{t}$$

wherein H represents the priority of the current cell, T represents the preset duration, $T_0$ represents a duration of which the current cell occupies the channel in the preset duration T prior to transmitting the data to be sent, t represents the channel occupation time required, β represents the adjustment factor determined according to the occupation condition of current cell channel resources and the service quality requirement of the data to be sent, and 0≤β≤1.

13. The device of claim 8, wherein the processor is further configured to:
calculate a current average channel occupation probability according to a continuous detection with clear channel assessment (CCA) in the latest time period prior to transmitting the data to be sent, when the current cell load value is greater than the preset cell load threshold value or the priority of the current cell is less than the preset priority threshold;
determine the channel detection parameter of the listen-before-talk mechanism according to the current average channel occupation probability and the latest feedback signals received prior to transmitting the data to be sent, wherein the latest feedback signals comprise an acknowledgment (ACK) signal and a non-acknowledgement (NACK) signal of hybrid automatic repeat request (HARQ), and the channel detection parameter of the listen-before-talk mechanism comprises a size of a contention window of a load-based channel detection mechanism;
determine a random number N of the load-based channel detection mechanism according to the size of the contention window; and
perform the channel detection with CCA according to the random number N, and to start to transmit the data when a value of the random number N is reduced to zero.

14. The device of claim 13, wherein the processor is configured to calculate the current average channel occupation probability according to the following formula:

$$P = \frac{N_F}{N_S + N_F}$$

wherein P represents the current average channel occupation probability, $N_s$ represents a number of times of idle channel detection in the continuous detection with clear channel assessment (CCA) in the latest time period prior to transmitting the data to be sent, and $N_F$ represents a number of times of busy channel detection in the continuous detection with clear channel assessment (CCA) in the latest time period prior to transmitting the data to be sent; and
wherein the size of the contention window is calculated according to the following formula:

$$Q = \begin{cases} q; \text{ when } P > 0.5 \text{ and the } ACK \text{ signal is received, or} \\ \quad \text{when } P \leq 0.5 \text{ and the } NACK \text{ signal is received} \\ \frac{q-1}{2}; \text{ when } P \leq 0.5 \text{ and the } ACK \text{ signal is received} \\ 2q+1; \text{ when } P > 0.5 \text{ and the } NACK \text{ signal is received} \end{cases}$$

wherein Q represents the size of the contention window in a current timeslot, q represents a size of a previous contention window, and $0 \leq N \leq Q$.

15. A non-transitory computer storage medium, configured to store programs which, when executed by a computer, are operable with the computer to:
compare a current cell load value with a preset cell load threshold value when there is data to be sent in a data buffer;
calculate a priority of a current cell based on a channel occupation time required for transmitting the data to be sent, a duration proportion of which the current cell occupies a channel in a preset duration prior to transmitting the data to be sent, and an adjustment factor determined according to an occupation condition of current cell channel resources and a service quality requirement of the data to be sent, when the current cell load value is less than or equal to the preset cell load threshold value;
compare the priority of the current cell with a preset priority threshold; and
perform a channel detection with clear channel assessment (CCA) according to a channel detection parameter of a listen-before-talk mechanism when the priority of the current cell is greater than the preset priority threshold, and start to transmit the data when the channel detection with CCA is completed.

16. The non-transitory computer storage medium of claim 15, wherein the programs being operable with the computer to perform the channel detection with the clear channel assessment (CCA) according to the channel detection parameter of the listen-before-talk mechanism are operable with the computer to:
perform the channel detection continuously, and start to transmit the data when a continuous channel idle time reaches a time length of time granularity of an initial channel detection.

17. The non-transitory computer storage medium of claim 15, wherein the programs are operable with the computer to:
determine the channel occupation time required according to a total size of data packets in the data buffer and current channel quality.

18. The non-transitory computer storage medium of claim 15, wherein the programs are operable with the computer to calculate the priority of the current cell according to the following formula:

$$H = \beta * \left(1 - \frac{T_0}{T}\right) + (1-\beta) * \frac{1}{t}$$

wherein H represents the priority of the current cell, T represents the preset duration, $T_0$ represents a duration of which the current cell occupies the channel in the preset duration T prior to transmitting the data to be sent, t represents the channel occupation time required, β represents the adjustment factor determined according to the occupation condition of current cell channel resources and the service quality requirement of the data to be sent, and $0 \leq \beta \leq 1$.

19. The non-transitory computer storage medium of claim 15, wherein the programs are operable with the computer to:
calculate a current average channel occupation probability according to a continuous detection with clear channel assessment (CCA) in the latest time period prior to transmitting the data to be sent, when the current cell load value is greater than the preset cell load threshold value or the priority of the current cell is less than the preset priority threshold;
determine the channel detection parameter of the listen-before-talk mechanism according to the current average channel occupation probability and the latest feedback signals received prior to transmitting the data to be sent, wherein the latest feedback signals comprise an acknowledgment (ACK) signal and a non-acknowledgement (NACK) signal of hybrid automatic repeat request (HARQ), and the channel detection parameter of the listen-before-talk mechanism comprises a size of a contention window of a load-based channel detection mechanism;
determine a random number N of the load-based channel detection mechanism according to the size of the contention window; and
perform the channel detection with CCA according to the random number N, and start to transmit the data when a value of the random number N is reduced to zero.

20. The non-transitory computer storage medium of claim 19, wherein the programs are configured to calculate the current average channel occupation probability according to the following formula:

$$P = \frac{N_F}{N_S + N_F}$$

wherein P represents the current average channel occupation probability, $N_s$ represents a number of times of idle channel detection in the continuous detection with clear channel assessment (CCA) in the latest time period prior to transmitting the data to be sent, and $N_F$ represents a number of times of busy channel detection in the continuous detection with clear channel assessment (CCA) in the latest time period prior to transmitting the data to be sent; and
wherein the size of the contention window is calculated according to the following formula:

$$Q = \begin{cases} q; \text{ when } P > 0.5 \text{ and the } ACK \text{ signal is received, or} \\ \quad \text{when } P \leq 0.5 \text{ and the } NACK \text{ signal is received} \\ \frac{q-1}{2}; \text{ when } P \leq 0.5 \text{ and the } ACK \text{ signal is received} \\ 2q+1; \text{ when } P > 0.5 \text{ and the } NACK \text{ signal is received} \end{cases}$$

wherein Q represents the size of the contention window in a current timeslot, q represents a size of a previous contention window, and $0 \leq N \leq Q$.

* * * * *